United States Patent [19]
Yabuta et al.

[11] 3,834,277
[45] Sept. 10, 1974

[54] HYDRAULIC SERVO UNIT FOR AUTOMOTIVE BRAKING SYSTEM

[75] Inventors: Keiichiro Yabuta; Kazuaki Shimizu, both of Yokohama, Japan

[73] Assignee: Nissan Motor Company, Limited, Yokohama, Japan

[22] Filed: Nov. 8, 1972

[21] Appl. No.: 304,678

[30] Foreign Application Priority Data
Dec. 11, 1971  Japan.............................. 46-100347

[52] U.S. Cl......................... 91/376, 91/372, 91/391
[51] Int. Cl............................................... F15b 9/10
[58] Field of Search............. 91/372, 373, 371, 370, 91/376

[56] References Cited
UNITED STATES PATENTS

| | | | |
|---|---|---|---|
| 1,840,882 | 1/1932 | Bragg et al............................ | 91/372 |
| 2,883,971 | 4/1959 | Ayers, Jr................................ | 91/373 |
| 3,054,387 | 9/1962 | Kellogg.................................. | 91/373 |
| 3,082,744 | 3/1963 | Gardner................................. | 91/372 |

*Primary Examiner*—Paul E. Maslousky

[57] ABSTRACT

A hydraulic servo unit for use with a master cylinder of a hydraulic braking system of a motor vehicle and adapted for reducing the physical effort required of a vehicle driver for producing a braking effect. The servo unit includes a housing having an inlet and an outlet, a power piston slidably accommodated within said housing and producing an actuating force to be transmitted to the master cylinder when fluid under pressure is applied on the power piston, valve means connected with the power piston for controlling the application of fluid under pressure on said power piston, and actuating means for controlling the valve means in accordance with a brake pedal position.

9 Claims, 6 Drawing Figures

HYDRAULIC SERVO UNIT FOR AUTOMOTIVE BRAKING SYSTEM

This invention relates in general to a hydraulic braking system for a motor vehicle and, more particularly, to a hydraulic pressure operated servo unit for use with a master cylinder of the hydraulic pressure braking system to reduce the physical effort of a vehicle driver and at the same time provide powerful braking when needed.

As is well known, it has heretofore been proposed to employ a vacuum operated servo unit in a hydraulic braking system of a motor vehicle with a view to reducing the physical effort required of a vehicle drive for providing powerful braking when needed. In this braking system most of the power to operate the vacuum operated servo unit is derived from a vacuum existing in an intake manifold of a vehicle engine when it is running. This vacuum is applied to one side of a power piston working in a cylinder, the other side being exposed to the pressure of the atmosphere. It is the difference between the atmospheric pressure and the depression in the intake manifold of the engine which causes the power piston to move. As the pressure difference between the intake manifold depression and the atmospheric pressure to be exerted on the power piston increases, a larger braking effect will be obtained. However, it is quite difficult to maintain the pressure difference across the power piston beyond a certain level so that insufficient braking effect will be produced. To solve this problem, an attempt has been made to utilize high pressure fluid in the braking system for thereby increasing the effort to be exerted on the master cylinder which produces the necessary braking pressure. A difficulty is encountered in this prior art method in that a large amount of leakage of hydraulic pressure is caused in the structural parts of the hydraulic braking system. Another difficulty encountered in this prior method is that a brake pedal cooperating with the vacuum operated servo unit is not smoothly moved.

It is, therefore, an object of the present invention to provide a novel hydraulic pressure operated servo unit for use in a braking system of a motor vehicle, which servo unit is adapted to reduce the physical effort of the vehicle driver and at the same time provide powerful braking by a simplified means.

It is another object of the present invention to provide a hydraulic pressure operated servo unit for use with a master cylinder of a braking system of a motor vehicle for producing high brake fluid pressure with a minimum physical effort of the vehicle driver.

It is another object of the present invention to provide a hydraulic pressure operated servo unit which is interposed between a manual control member and a master cylinder of a braking system of a motor vehicle and which produces a great actuating force to be transmitted to the master cylinder whereby the master cylinder will generate a great brake fluid pressure.

It is still another object of the present invention to provide a hydraulic pressure operated servo unit which is interposed between a manual brake control member and a master cylinder of the braking system of a motor vehicle and which is adapted to be directly actuated by the manual control member even when a failure occurs in a brake fluid circuit for thereby producing an actuating force to be transmitted to the master cylinder.

It is a further object of the present invention to provide a hydraulic pressure operated servo unit which is simplified in construction and can readily be installed in existing braking systems of a motor vehicle.

These and other features and advantages of the present invention will become more apparent from the following description when taken in conjuction with the accompanying drawings wherein like component parts are designated by same reference numerals and in which.

Figure 1:
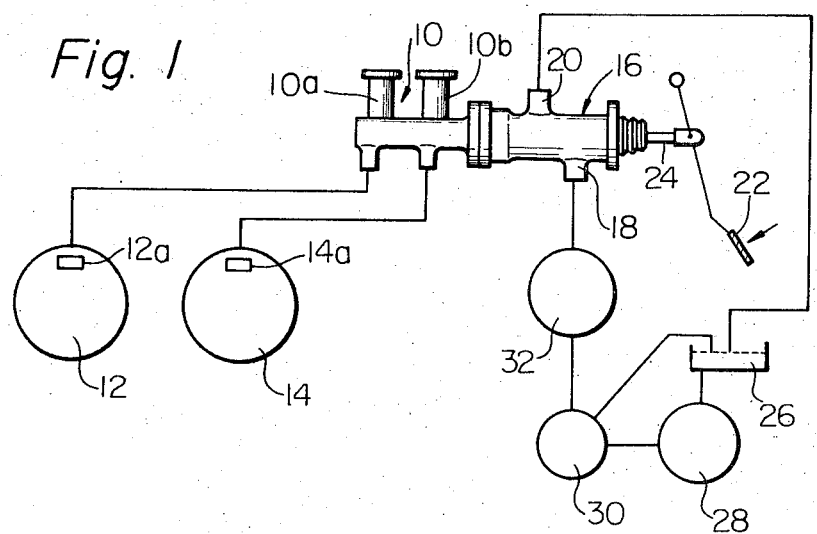
FIG. 1 is a schematic view of a typical hydraulic braking system incorporating a hydraulic pressure operated servo unit according to the present invention.

Referring now to the drawings and more particularly to FIG. 1, there is schematically shown a general construction of a hydraulic braking system incorporating the hydraulic servo unit according to the present invention. The hydraulic braking system includes, as customary, a master cylinder 10 having separate front and rear sections 10a and 10b which are hydraulically connected to wheel cylinders 12a and 12b of front and rear wheels 12 and 14, respectively. The braking system shown in FIG. 1 further includes a hydraulic pressure operated servo unit 16 having an inlet 18 and an outlet 20, which servo unit 16 is controlled by means of a usual brake pedal 22 through an interconnecting control rod 24. The inlet 18 of the servo unit 16 is supplied with a fluid under pressure from a sump or reservoir 26 through a fluid pump 28, a cut off device 30 and an accumulator 32. The accumulator 32 serves to maintain a supply of high pressure fluid under pressure of a suitable compressed gas chamber, even when the pump 28 is not pumping. The cut off device 30 serves to cut off the pump 28 whenever the pressure in the accumulator 32 exceeds a predetermined upper limit, and causes the pump 28 to charge the accumulator 32 whenever the pressure in the accumulator 32 drops below the predetermined limit. The pressurized fluid in the accumulator 32 is continuously supplied therefrom to the inlet 18 of the hydraulic servo unit 16 and the pressurized fluid supplied to the servo unit 16 is returned through the outlet 20 to the reservoir 26.

Figure 2:
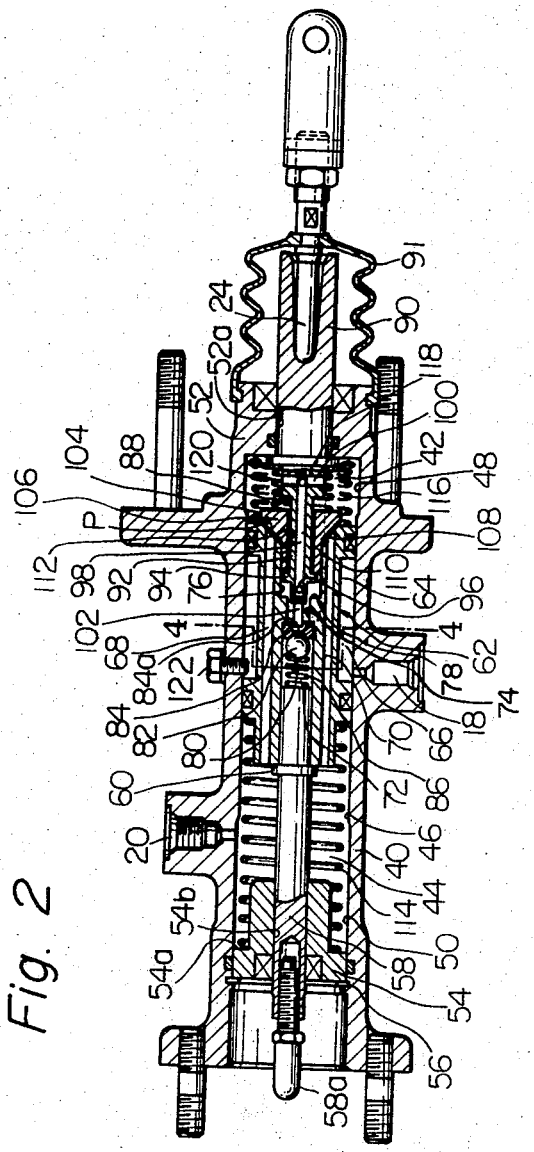
FIG. 2 is a cross sectional view of a preferred embodiment of the hydraulic pressure operated servo unit shown in FIG. 1.
Figure 3:
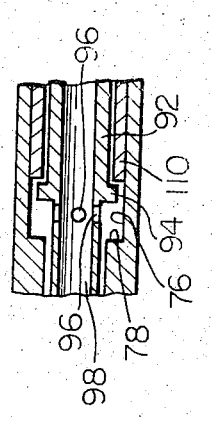
FIG. 3 is an enlarged cross sectional view of a structure forming part of the hydraulic pressure operated servo unit shown in FIG. 2.
Figure 4:
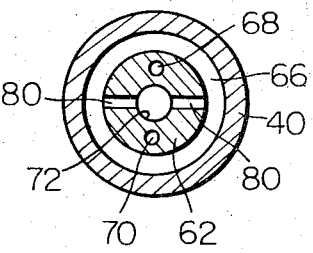
FIG. 4 is a cross sectional view taken on line 4—4 of FIG. 2.

A detail construction of the hydraulic servo unit 16 is illustrated in FIGS. 2, 3 and 4. As shown, the servo unit 16 includes a cast metal housing 40 having formed therein first and second fluid chambers 42 and 44 between which a cylindrical bore 46 is formed in the housing 40 at its intermediate portion. The first fluid chamber 42 is defined by a cylindrical bore 48 formed at the righthand portion of the housing 40 whereas the second fluid chamber 44 is defined by a cylindrical bore 50 formed at the left-hand portion of the housing 40. The inlet 18 communicates with the cylindrical bore 46 for admitting thereto pressurized fluid from the accumulator 32 (see FIG. 1), while the outlet 20 communicates with the cylindrical bore 46 for permitting the pressurized fluid in the second fluid chamber 44 to pass into the fluid reservoir 26 (see FIG. 1). The cylindrical bore 48 is closed off at its one end by means of an end wall 52 and communicates at its other end with the cylindrical bore 46. The cylindrical bore 50 communicates at its one end with the cylindrical bore 46 and is closed off at the other end thereof by means of an annular end closure member 54 which is held in position by a snap ring 56 secured to the housing 40.

The annular closure member 54 has an axially and radially extending annular shoulder 54a which serves as a spring seat as will be described in detail. Tha annular closure member 54 also has formed therein a cylindrical bore 54b, in which a push rod 58 is slidably accommodated. The push rod 58 is provided at its forward end portion with an annular flange 60 which acts in a manner to be discussed hereinafter. This push rod 58 has a rear-ward end portion 58a which coacts with a piston (not shown) of the master cylinder 10 (see FIG. 1) for producing a brake fluid pressure.

The axial movements of the push rod 58 is controlled by a power piston 62 which is slidably accommodated in the cylindrical bore 46. As best seen in FIGS. 2 and 4, the power piston 62 has formed at its outer periphery an annular recess 64 forming a third fluid chamber 66 which communicates with the inlet 18 to receive fluid under pressure therefrom. The power piston 62 is provided with axially extending fluid passageways 68 and 70 which, when opened, provide fluid communication between the first and second fluid chambers 42 and 44, coaxial consecutively arranged cylindrical bores 72, 74 and 76, a radially outwardly extending annular shoulder 78 formed between the cylindrical bores 74 and 76, and openings 80. As clearly seen in FIG. 4, each of the openings 80 extends radially so that fluid communication between the third fluid chamber 66 and the cylindrical bore 72 is provided.

As shown in FIG. 2, the forward end portion of the push rod 58 is tightly inserted in the cylindrical bore 72 of the power piston 62 and the annular flange 60 of the push rod 58 abuts on the end wall of the power piston 62 so that the push rod 58 is axially movable with the power piston 62. With this arrangement, since the cylindrical bore 72 is closed off at its one end by the forward end portion of the push rod 58, the fluid under pressure admitted through the openings 80 into the cylindrical bore 72 is delivered through the cylindrical bore 74 into the cylindrical bore 76. The fluid under pressure thus delivered into the cylindrical bore 76 is allowed into the first fluid chamber 42 in a manner as will be clearly described in detail.

Flow out of the fluid under pressure through the cylindrical bore 72 is controlled by means of a ball valve 82. The ball of the ball valve 82 is pressed into engagement with an elastomeric valve seat 84 which is disposed in the cylindrical bore 72 at its bottom portion. A suitable compression spring 86 is disposed within the cylindrical bore 72 between the end wall of the push rod 58 and the ball of the ball valve 82 for biasing the same toward the elastomeric valve seat 84 to close a central opening 84a formed therein thereby to interrupt fluid communication between the cylindrical bore 72 and the cylindrical bore 74. The ball of the ball valve 82, the elastomeric valve seat 84 and the compression spring 86 constitute a check valve which acts in a manner as will be described in detail.

The check valve is controlled by an actuating plunger 88 which is integrally formed with an operating rod 90 cooperating with the control rod 24, and the operating rod 90 is slidably received in a bore 52a formed in the end wall 52. The operating rod 90 is shown as covered at its forward end by a bellows-like dust cover 91. The actuating plunger 88 has an axially extending cylindrical portion 92 and an annular projection 94 extending radially outwardly from one end of the cylindrical portion 92, the outer diameter of the annular projection 94 being slightly smaller than the diameter of the cylindrical bore 76 in which the annular projection 94 moves. As seen from FIGS. 2 and 3, the actuating plunger 88 has formed therein a plurality of radially extending openings 96 communicating with the cylindrical bore 76 of the power piston 62, a longitudinally extending fluid passageway 98 communicating with the plurality of openings 96, and a plurality of transversely extending fluid passageways 100 communicating with the longitudinal fluid passageway 98 and opening into the first fluid chamber 42. Secured at one end of the actuating plunger 88 is an actuating member 102 which extends into the cylindrical bore 74 of the power piston 64 and which, when moved leftwardly of the drawing, abuts on the ball of the ball valve 82 to move the same out of engagement with the valve seat 84 for thereby opening the central opening 84a to admit the fluid in the cylindrical bore 72 into the cylindrical bore 76 through which the fluid under pressure is allowed into the openings 96 of the actuating plunger 88.

As seen in FIG. 2, a cone-shaped valve element 104 is provided for opening and closing the fluid passageways 68 and 70 formed in the power piston 62 for thereby controlling the fluid communication between the first and second fluid chambers 42 and 44. In this illustrated embodiment, the valve element 104 is shown to have a conical valve head 106 which is engageable with a conical valve seat 108 formed at the edge portion of the power piston 62, and a sleeve portion 110 which is slidably fitted in the cylindrical bore of the power piston 62. The valve element 104 also has formed therein a cylindrical bore 112 through which the cylindrical portion 92 of the actuating plunger 88 extends. As shown, one end of the sleeve portion 110 abuts on the annular projection 94 of the actuating plunger 88 so that the cone-shaped valve element 104 is axially movable with the movements of the actuating plunger 88. It should be noted that the conical angle of the conical valve seat 108 is preferably designed to be slightly smaller than that of the conical valve head 106 of the cone-shaped valve element 104 to cause both of the valve head 106 and the valve seat 108 to engage each other at their outer peripheries as indicated at P in FIG. 2. This ensures complete sealing function between the fluid passageways 68 and 70 and the first fluid chamber 42.

A suitable compression spring 114 is provided in the second fluid chamber 44 for biasing the power piston 62 in a direction to cause the push rod 58 to act on the master cylinder so as to decrease the brake fluid pressure. This compression spring 114 has one end seated on the spring seat 54a formed in the annular closure member 54 and the other end seated on one end portion of the power piston 62. Another compression spring 116 is provided in the first fluid chamber 42 for biasing the operating rod 90 rightwardly, as viewed in FIG. 2. This compression spring 116 has one end seated on the other end of the power piston 62 and the other end seated on a spring seat 118 mounted on the rearward end of the operating rod 90. The force of the compression spring 116 is determined to have a value which is smaller than that of the compression spring 114 so that the power piston 62 is normally moved rightwardly of the drawing. As seen in FIG. 2, an additional compression spring 120 is provided in the first fluid chamber 42 between the spring seat 118 and the cone-shaped valve element 104 for biasing the same in direction to close the fluid passageways 68 and 70. The spring force of the compression spring 120 is determined to have a value to be smaller than that of the compression spring 116. Indicated by reference numeral 122 is a stop which is mounted in the housing 40 and which extends into a space defined by the annular recess 64 of the power piston 62 for limiting the axial movements of the power piston 62 for thereby establishing fluid communication between the inlet 18 and the third fluid chamber 66 at all times to permit the fluid under pressure from the accumulator to pass into the third fluid chamber 66.

With this arrangement, the power piston 62 is moved rightwardly of the drawing against the forces of the compression springs 116 by the force of the compression spring 114 until the end wall of the annular recess 64 abuts on the stop 122. In the normal released condition of the brake pedal, the control rod 24 and accordingly the operating rod 90 are held in their right-most positions, as shown in FIG. 2, by the action of the compression spring 116. In this instance, the annular projection 94 of the actuating plunger 88 abuts on the end portion of the sleeve portion 110 so that the cone-shaped valve element 104 is moved rightwardly of the drawing against the force of the compression spring 120. Consequently, the fluid passageways 68 and 70 are opened thereby providing fluid communication between the first and second fluid chambers 42 and 44 and, therefore, the fluid under pressure prevailing in the first fluid chamber 42 is admitted through the fluid passageways 68 and 70 into the second fluid chamber 44. The fluid under pressure thus admitted to the second fluid chamber 44 is then delivered through the outlet 20 to the fluid reservoir 26 (see FIG. 1). At the same time, since the actuating member 102 secured to the end of the actuating plunger 88 assumes the position shown in FIG. 2, the ball of the ball valve 82 is held in tight sealing engagement with the elastomeric valve seat 84 by the action of the compression spring 86, thereby interrupting fluid communication between the cylindrical bore 74 and the openings 80. Under this circumstance, the fluid under pressure in the inlet 18 is prevented from being fed into the first fluid chamber 42 and, thus, there is no fluid pressure acting on the power piston 62 for moving the same leftwardly of the drawing so that the power piston 62 and accordingly the push rod 58 connected thereto are held in right-most position as shown in FIG. 2 whereby no brake fluid pressure is produced.

When, however, the brake pedal 22 is depressed with a view of providing braking effort, the control rod 24 and accordingly the operating rod 90 are moved leftwardly, as viewed in FIG. 2. In this instance, the annular projection 94 of the actuating plunger 88 disengages the sleeve portion 110 of the cone-shaped valve element 104 so that the cone-shaped valve element 104 slides on the cylindrical portion 92 of the actuating plunger 88 in leftward direction by the action of the compression spring 120. This causes the conical valve head 106 of the valve element 104 to be brought into tight sealing engagement with respect to the conical valve seat 108 formed at the edge portion of the power piston 62 thereby interrupting fluid communication between the fluid passageway 68 and 70, and the first fluid chamber 42. At the same time, the actuating member 102 secured to the end of the actuating plunger 88 abuts on the ball of the ball valve 82 to bias it out of engagement with respect to the elastomeric valve seat 84 against the force of the compression spring 86. Under this circumstance, the opening 84a of the valve seat 84 is opened thereby permitting the fluid under pressure transmitted into the cylindrical bore 72 through the openings 80 to pass into the cylindrical bore 76 through the cylindrical bore 74. The fluid under pressure thus admitted to the cylindrical bore 76 is then delivered through the openings 96 formed in the actuating plunger 88 into the longitudinal fluid passageway 98, from which the fluid under pressure is passed through the transverse fluid passageways 100 into the first fluid chamber 42. Since, in this instance, the fluid passageways 68 and 70 are closed off by the cone-shaped valve element 104, the fluid under pressure admitted to the first fluid chamber 42 acts on the power piston 62 and, therefore, the power piston 62 is moved leftwardly of the drawing against the force of the compression spring 114 thereby moving the push rod 58 in the same direction for thereby producing a thrust to be exerted on the master cylinder 10 (see FIG. 1). Since, at this instance, the check valve mounted within the power piston 62 is moved leftwardly of the drawing, the actuating member 102 of the actuating plunger 88 disengages the ball of the ball valve 82 so that the check valve is closed again to interrupt fluid communication between the cylindrical bores 72 and 74. Thereafter, the annular projection 94 of the actuating plunger 88 abuts on the sleeve portion 110 of the valve element 104 to cause the conical valve head 106 of the valve element 104 to disengage the conical valve seat 108 of the power piston 62 so that the fluid passageways 68 and 70 are temporarily opened thereby permitting a part of the fluid under pressure in the first fluid chamber 42 to pass into the second fluid chamber 44. If, in this condition, the fluid pressure in the first fluid chamber 42 is decreased to a certain level, then the power piston 62 is moved rightwardly of the drawing by the action of the compression spring 114 so that the fluid passageways 68 and 70 are closed by the valve element 104. Thus, the fluid pressure in the first fluid chamber 42 is maintained at a level substantially in proportion to the thrust E exerted on the operating rod 90. Continuous inward movement of the operating rod 90 increases the fluid pressure in the first fluid chamber 42 in a manner as previously described and, therefore, an increased thrust Q is obtained.

Figure 5:
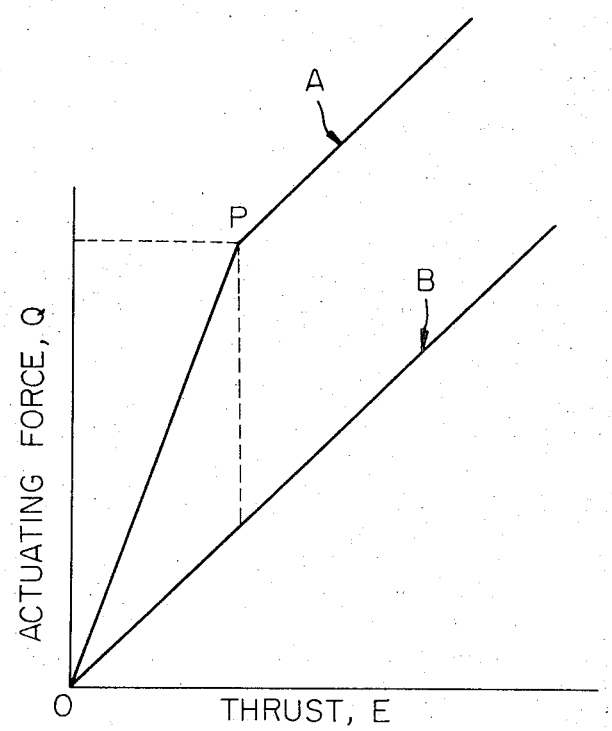
FIG. 5 is a graph showing an example of the relation between the thrust on the control member of the hydraulic servo unit and the actuating force transmitted to the master cylinder connected thereto.

As the fluid pressure in the first fluid chamber 42 reaches the level of the fluid pressure in the inlet 18, the annular projection 94 of the actuating plunger 88 abuts on the annular shoulder 78 formed in the power piston 62 between the cylindrical bores 74 and 76 and, thereafter, the check valve is completely opened. At this instant, the push rod 58 is moved leftwardly of the drawing by the power piston 62 by a force produced by the fluid pressure acting on the end of the power piston 62 and a force exerted on the brake pedal 22 (see FIG. 1) because the brake pedal pressure is directly transmitted through the control rod 24, the operating rod 90 and the actuating plunger 88 to the annular shoulder 78 of the power piston 62. Thus, an actuating force Q exerted on the master cylinder 10 (see FIG. 1) is varied in a manner as shown by a curve A in FIG. 5. More specifically, the actuating force Q increases in proportion to the thrust E from the point O to the point P in the graph of FIG. 5 and, thereafter, the actuating force Q increases at the angle of 45° to the axis of the abscissa as a function of the thrust E plus fluid pressure exerted on the power piston 62.

When the brake pedal 22 is released, the operating rod 90 is moved rightwardly of the drawing by the fluid pressure and springs 116 and 120 acting thereon. In this instance, the actuating member 102 secured to the actuating plunger 88 disengages the ball of the ball valve 82 so that it engages the valve seat 84 by the action of the compression spring 86 in a manner as prescribed. Accordingly, the fluid communication between the cylindrical bore 72 and the cylindrical bore 74 is interrupted to prevent the fluid under pressure in the cylindrical bore 72 from being admitted to the first fluid chamber 42. At the same time, valve element 104 is moved rightwardly as viewed in FIG. 2 by the actuating plunger 88 for thereby providing fluid communication between the first and second fluid chambers 42 and 44 so that the fluid under pressure remaining in the first fluid chamber 42 is fed through the fluid passageways 68 and 70 into the second fluid chamber 44, from which the fluid under pressure is discharged through the outlet 20 into the fluid reservoir 26 (see FIG. 1). Thus, there is no fluid under pressure acting on the power piston 62 with a result that the power piston 62 is moved rightwardly of the drawing by the action of the compression spring 114 while the operating rod 90 is moved to its initial position by the action of the compression spring 116.

Upon failure of the braking fluid circuit, the braking system can be manually operated by depressing the brake pedal 22 to cause the annular projection 94 of the actuating plunger 88 to abut on the annular shoulder 78 of the power piston 62 and thereby move the power piston 62 leftwardly of the drawing. Thus, the actuating force Q exerted on the master cylinder is varied in accordance with the curve B in FIG. 5.

Figure 6:
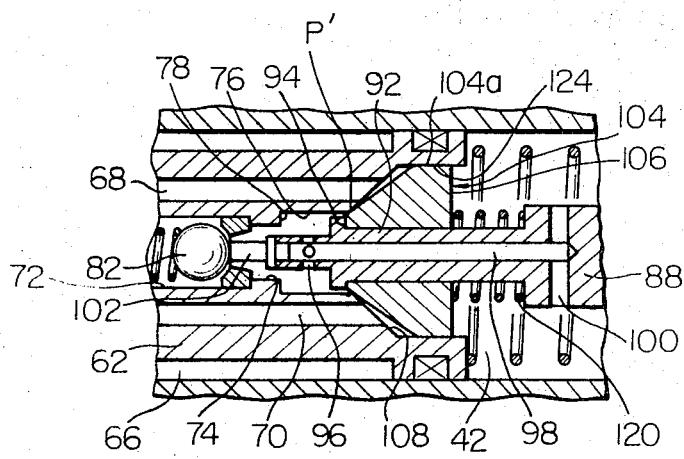
FIG. 6 is an enlarged cross sectional view illustrating a modified form of another structure forming a part of the hydraulic servo unit shown in FIG. 2.

FIG. 6 illustrates a modified form of a structure forming part of the hydraulic servo unit according to the present invention. In this modification, the power piston 62 is shown as provided with an auxiliary valve surface 124 and the conical valve seat, designated at 108, is formed between the cylindrical bore 76 and the auxiliary valve surface 124. The conical angle of the valve seat 108 is preferably designed to be slightly larger than that of the conical valve head 106 so that the conical valve head 106 of the cone-shaped valve element 104 engages with the conical valve seat 108 at a contact point indicated by P' in FIG. 6. At this instant, the outer peripheral wall 104a of the cone-shaped valve element 104 contacts the auxiliary valve surface 124 at its outer periphery With this construction, if the actuating plunger 88 connected to the operating rod is moved leftwardly as viewed in FIG. 6, then the annular projection 94 is caused to be out of engagement with the cone-shaped valve element 104. Since, in this condition, the valve element 104 is biased by a compression spring 120, the valve element 104 is forced to abut on the valve seat 108 so that the fluid passageways 68 and 70 are closed. Under this circumstance, the pressurized fluid in the cylindrical bore 76 is admitted through the openings 96 into the longitudinal fluid passageway 98 from which the fluid under pressure is delivered through the transverse fluid passageways 100 into the first fluid chamber 42 of the housing. If, however, the actuating plunger 88 is moved rightwardly as viewed in FIG. 6 to cause the annular projection 94 to abut on the valve element 104, then the valve element 104 disengages the valve seat 108 for thereby providing fluid communication between the fluid passageways 68 and 70, and the cylindrical bore 76. Under this circumstance, the fluid pressure in the first fluid chamber 42 is discharged from the fluid passageways 100 and 98 through the openings 96 into the fluid passageways 68 and 70.

It will now be appreciated from the foregoing description that the present invention provides a novel hydraulic servo unit which is capable of producing a greater braking effect through a minimum of manual control movement and, which is capable of producing a sufficient braking effect even when a failure occurs in a braking fluid circuit.

What is claimed is:

1. A hydraulic servo valve unit for use in a hydraulic braking system of a motor vehicle having a brake pedal, comprising a housing having formed therein an inlet and an outlet; a first fluid chamber formed in said housing and communicating with said inlet, a second fluid chamber formed in said housing and communicating with said outlet, a power piston slidably accomodated within said housing between said first and second fluid chambers and having formed therein at least one fluid passageway communicating with said first and second fluid chambers, said power piston having formed therein bore means communicating with said inlet, a cone-shaped valve element for opening and closing said at least one fluid passageway formed in said power piston, an operating rod partially extending into said first fluid chamber of said housing and axially movable by said brake pedal, an actuating plunger integrally connected to said operating rod and axially extending into said first fluid chamber for actuating said cone-shaped valve element, a check valve disposed in said bore means of said power piston and actuated by said actuating plunger for controlling fluid communication between said inlet and said first fluid chamber, a first spring means disposed in said first fluid chamber for biasing said power piston in one direction, a second spring means disposed in said second fluid chamber for biasing said power piston in another direction, and a third spring means disposed in said first fluid chamber for biasing said cone-shaped valve element toward said power piston for closing said fluid passageway of said power piston, the arrangement being such that, when said operating rod and accordingly said actuating plunger are moved in one direction, said actuating plunger causes said cone-shaped valve element to move in a position to close said at lease one fluid passageway formed in said power piston and at the same time opens said check valve to provide fluid communication between said inlet and said first fluid chamber for admitting fluid under pressure into said first fluid chamber whereby the fluid under pressure admitted thereto acts on said power piston to produce an actuating force, whereas, when said actuating plunger is moved in another direction, said actuating plunger closes said check valve to prevent the fluid under pressure from being supplied into said first fluid chamber and at the same time causes said cone-shaped valve element to open said at least one fluid passageway formed in said power piston for discharging the fluid under pressure remaining in said first fluid chamber through said second fluid chamber into said outlet whereby the fluid under pressure is prevented from acting on said power piston.

2. A hydraulic servo unit as claimed in claim 1, wherein said power piston has formed on its outer periphery an annular recess which forms a third fluid chamber communicating with said inlet and at least one radially extending opening to provide fluid communication between said bore means of said power piston and said third fluid chamber.

3. A hydraulic servo unit as claimed in claim 1, wherein said actuating plunger includes an axially extending cylindrical portion on which said cone-shaped valve element is slidably mounted, a radially extending annular projection formed at an end portion of said cylindrical portion, said annular projection abutting on said cone-shaped valve element when said actuating plunger is moved in said another direction to open said fluid passageway of said power piston, an actuating member secured to one end of said actuating plunger and causing said check valve to be opened when said actuating plunger is moved in said one direction.

4. A hydraulic servo unit as claimed in claim 3, wherein said actuating plunger further includes fluid passageways for providing fluid communication between said bore means of said power piston and said first fluid chamber.

5. A hydraulic servo unit as claimed in claim 2, wherein said power piston also has formed at one end thereof a conical valve seat which said cone-shaped valve element engages to close said fluid passageway of said power piston.

6. A hydraulic servo unit as claimed in claim 5, wherein the conical angle of said conical valve seat is slightly smaller than that of said cone-shaped valve element.

7. A hydraulic servo unit as claimed in claim 5, wherein the conical angle of said conical valve seat is slightly larger than that of said cone-shaped valve element, and wherein said power piston is provided with an auxiliary valve surface which said cone-shaped valve element contacts at its outer periphery.

8. A hydraulic servo unit for use in hydraulic brake system of a motor vehicle having a brake pedal, said servo unit comprising a housing, said housing having formed therein an inlet, and an outlet, a first fluid chamber formed in said housing and communicating with said inlet, a second fluid chamber formed in said housing and communicating with said outlet, a power piston slidably accommodated in said housing between said first and second fluid chambers and including at least one fluid passageway to provide communication between said first and second fluid chambers, bore means formed in said power piston and providing communication between said inlet and said first fluid chamber and a conical valve seat formed at one end of said power piston, a cone-shaped valve element having a conical valve head seated on said conical valve seat of said power piston for closing said at least one fluid passageway of said power piston, a check valve disposed in said bore means of said power piston for controlling fluid communication between said inlet and said first fluid chamber, a control rod mechanically connected to said brake pedal and axially moved thereby, an operating rod cooperating with said control rod, an actuating plunger integrally connected to said operating rod and axially extending through said first fluid chamber into said bore means of said power piston, said actuating plunger including an axially extending cylindrical portion, a radially extending annular projection formed at one end of said cylindrical portion and an actuating member secured to one end of said actuating plunger, said annular projection selectively abutting on said cone-shaped valve element and said actuating member selectively opening said check valve, said actuating plunger also including fluid passageways for providing fluid communication between said bore means of said power piston and said first fluid chamber, a first compression spring disposed in said first fluid chamber for biasing said power piston in one direction, a second compression spring disposed in said second fluid chamber for biasing said power piston in another direction, a third compression spring disposed in said first fluid chamber for biasing said cone-shaped valve element toward said conical valve seat on said power piston, and a push rod fixed to said power piston and axially movable therewith, the arrangement being such that, when said brake pedal is depressed to cause said control rod and accordingly said operating rod to axially move in said one direction, said actuating plunger is moved in the same direction to cause said annular projection to be out of abutting engagement with said cone-shaped valve element for thereby causing said cone-shaped valve element to be seated on said conical valve seat of said power piston by the action of said third compression spring and at the same time causes said actuating member secured to said actuating plunger to open said check valve, whereby fluid under presssure is admitted through said inlet and said bore means of said power piston and said fluid passageways of said actuating plunger into said first fluid chamber and acts on said power piston to move said power piston and accordingly said push rod in said one direction, whereas, when said brake pedal is released said operating rod is moved in said another direction by the action of said second compression spring and the action of the fluid under pressure acting thereon to cause said actuating member to close said check valve to prevent the fluid under pressure from being admitted to said first fluid chamber and at the same time causes said annular projection of said actuating plunger to abut on said cone-shaped valve element thereby to cause the same to unseat from said conical valve seat formed on said power piston thereby to open said fluid passageway of said power piston against the action of said third compression spring, whereby the fluid under pressure remaining in said first fluid chamber is discharged through said second fluid chamber into said outlet.

9. A hydraulic servo unit as claimed in claim 8, wherein said power piston has formed therein a radially extending annular shoulder on which said annular projection of said actuating plunger abuts to transmit a brake pedal pressure to said power piston.

* * * * *